United States Patent [19]

Oliver, Jr. et al.

[11] Patent Number: 4,528,102
[45] Date of Patent: * Jul. 9, 1985

[54] CHEMICALLY CLEANING AQUEOUS FLUID OF INSOLUBLE SOLIDS

[76] Inventors: John E. Oliver, Jr.; Arnold M. Singer, both of Clear Fluids, Inc., P.O. Box 27526, Houston, Tex. 77227

[*] Notice: The portion of the term of this patent subsequent to Jun. 12, 2001 has been disclaimed.

[21] Appl. No.: 521,187

[22] Filed: Aug. 8, 1983

Related U.S. Application Data

[63] Continuation-in-part of Ser. No. 310,653, Oct. 13, 1981, Pat. No. 4,456,537, Ser. No. 450,519, Dec. 17, 1982, , and Ser. No. 420,140, Aug. 20, 1982, Pat. No. 4,453,598.

[51] Int. Cl.$^3$ ............................................. C02F 1/54
[52] U.S. Cl. ............................ 210/705; 210/727; 210/728; 252/8.55 B
[58] Field of Search ............ 252/8.5 R, 8.5 A, 8.5 B, 252/8.5 C, 8.55 R, 8.55 B; 166/312; 210/725, 727, 728, 729, 705

[56] References Cited

U.S. PATENT DOCUMENTS

| | | | |
|---|---|---|---|
| Re. 23,614 | 1/1953 | Denman | 210/749 |
| 2,315,734 | 4/1943 | Ralston et al. | 252/326 |
| 2,343,430 | 3/1944 | Wells et al. | 210/749 |
| 2,978,026 | 4/1961 | Bemis | 252/8.55 X |
| 3,025,236 | 3/1962 | Barrett et al. | 252/8.5 |
| 3,086,938 | 4/1963 | Means et al. | 252/8.55 |
| 3,122,203 | 2/1964 | Hawkins | 252/8.55 X |
| 3,411,580 | 11/1968 | McKinney et al. | 166/312 X |
| 3,524,908 | 8/1970 | Redmore et al. | 210/749 |
| 3,617,568 | 11/1971 | Ries | 210/727 |
| 3,737,037 | 6/1973 | Bone | 175/66 X |
| 3,787,319 | 1/1974 | Larsen | 252/8.5 |
| 3,798,270 | 3/1974 | Lee et al. | 260/566 |
| 3,882,029 | 5/1975 | Fischer et al. | 252/8.5 |
| 4,025,443 | 5/1977 | Jackson | 252/8.5 |
| 4,032,460 | 6/1977 | Zilch et al. | 252/8.55 |
| 4,140,639 | 2/1979 | Jackson | 252/8.5 |
| 4,172,801 | 10/1979 | Jackson | 252/8.5 |
| 4,233,162 | 11/1980 | Carney | 252/8.5 |
| 4,255,258 | 3/1981 | Carr et al. | 210/727 |
| 4,453,598 | 6/1984 | Singer et al. | 166/312 |
| 4,456,537 | 6/1984 | Oliver et al. | 252/8.5 X |

*Primary Examiner*—Herbert B. Guynn
*Attorney, Agent, or Firm*—Vaden, Eickenroht, Thompson & Jamison

[57] ABSTRACT

A process for removing contaminating insoluble solids (e.g., rust, sand, scale, barite and drilling mud) from an aqueous fluid such as produced in well systems during cleaning operations before placement of packer brines. A small effective amount of an alcohol, and a surface active chemical aid, are thoroughly intermixed into the aqueous fluid. The concentration and/or composition of the alcohol and/or surface active chemical aid is adjusted to control agglomeration of the insoluble solids and then to settle, float or suspend same in the aqueous fluid. After the solids agglomerate, the solids are separated in a quiescent separation zone from the fluid by decantation, flotation or filtration, respectively.

17 Claims, No Drawings

CHEMICALLY CLEANING AQUEOUS FLUID OF INSOLUBLE SOLIDS

RELATED APPLICATIONS

This is a continuation-in-part of application Ser. No. 310,653 filed Oct. 13, 1981 now U.S. Pat. No. 4,456,537 and application Ser. No. 450,519 filed Dec. 17, 1982, both entitled "Chemically Cleaning Drilling/Completion/Packer Brines"; and application Ser. No. 420,140 filed Aug. 20, 1982, entitled "Improved Drilling Mud Displacement Process" now U.S. Pat. No. 4,453,598.

BACKGROUND OF THE INVENTION

1. Field of the Invention

This invention relates to the removal of insoluble solids from aqueous fluids and it relates more particularly, to the removal of these solids from aqueous fluids used to clean a well system or from other operations.

2. Description of the Prior Art

There are many industries faced with disposal of aqueous fluids containing significant amounts of insoluble solids. For example, the processing of mined ores for their mineral values generates large volumes of aqueous fluids loaded with suspended solids in physical environments where their separation under stokes law by settling or flotation is impractical, and thus, the separation must be enhanced by physical and chemical means.

In another valuable industry, the drilling, completion and workover of well systems, large volumes of aqueous fluid can be produced carrying varying amounts of oily material and insoluble solids such as rust, scale, sand, barite, metal carbonates, cement and drilling muds (both water and oil based types). Before a well bore is completed, and especially before brine packer fluids can be used, the well system (tubing, casing, well bore, well head and flow lines) are cleaned by circulation therethrough of wash water. The wash water may have additives to remove thoroughly the residual insoluble solids from the well system. Reference may be taken to our related patent application Ser. No. 420,140 now U.S. Pat. No. 4,453,598 for an "Improved Drilling Mud Displacement Process" wherein is described a very effective procedure to remove residual insoluble solids from the well systems. The resultant aqueous fluid is the wash water carrying insoluble solids of the aforementioned types and may include soluble material such as sea water, and packer and completion brines.

In some instances, as where slug displacement cleaning procedures are encountered, a very valuable packer brine can become contaminated with insoluble solids. These contaminated brines cannot be used for packer or completion services since the solids will precipitate in time upon the packer, seriously injure the formation by plugging the pore space therein or even of the perforations and channels providing fluid flows between the formations and wellbore. Reference may be taken to our related patent applications Ser. No. 310,653 now (U.S. Pat. No. 4,456,537) and 450,519, filed Oct. 19, 1982 and Dec. 12, 1982, respectively both entitled "Chemically Cleaning Drilling/Completion/Packer Brines" for a procedure to remove insoluble solids from the high density brines formed of the sodium, calcium and zinc salts with chloride or bromide. These brines must be cleaned so that the residual insoluble solids are less than 5 microns in maximum dimension and are less than about 0.02% by weight in the brine.

The treatment of aqueous fluids to remove insoluble solids is especially difficult on offshore rigs because of the limited space and equipment that is available and capable of effective solids removal.

If the amount of solids in the aqueous fluid were small in amount, the rig equipment may be used for their removal usually in a stepwise flow pattern through conventional rig filters. However, the costs of manpower and rig time in filtering the fluid is usually prohibitive (e.g., $100,000 per each work shift) unless the solids are (1) less than 0.01% of the well fluid, (2) granular, and (3) not gelatinous as is usually the case with bentonite mud contamination.

The use of conventional rig filters is impractical on other than very low solid contents in the aqueous fluid. Further, rig time in equipment and manpower is restricted and available only for critical operations, namely optimum drilling of the well bore. As a result, aqueous fluid with large solids contamination must be either discarded or returned to some facility for purification. If the aqueous fluid is to be reused, it must be treated to remove the solids in most cases. Usually, the aqueous fluid cannot be discarded or disposed in most regions with its content of insoluble solids and oily material because of the EPA and State pollution abatement laws.

The rig equipment is not usually universal in being able to remove the insoluble solids from the aqueous fluid by filtration, settling (decanting) and flotation processes. In most instances, the available rig equipment would be able to perform one of these solids separation functions. Unhappily, the operator responsible for solids removal from the aqueous fluid only has last minute notice of which separation function will be available in the rig equipment.

The present invention is a process that provides for removal of insoluble solids from aqueous fluid using a minimum of chemicals and simple procedural steps; and the solids removal can be selectively arranged for settling, flotation or filtration functions.

SUMMARY OF THE INVENTION

In accordance with this invention, there is provided a process for removing insoluble solids and materials, such as rust, scale, sand, barite, lubricants, oils and drilling mud from an aqueous fluid such as produced in well systems during cleaning operations. A small but effective amount of an alcohol with between 5 and 14 carbon atoms (and mixtures thereof) and a water insoluble surface active chemical aid are introduced into the aqueous fluid. The surface active chemical aid is essentially a surfactant which has a molecular weight in the range of about 150 to 500 with predominant hydrophobic characteristics. The surfactant is selected from the group comprising amines, amides and amine oxides wherein the amine and amide and amine oxide have an alkyl group with between 8 and 18 carbon atoms. The concentration and/or composition of the aid is adjusted to control agglomeration of the insoluble solids and then to settle, float or suspend them in the aqueous fluid. In a quiescent separation zone, the agglomerated solids are removed by decantation, flotation or filtration, respectively.

DESCRIPTION OF THE PREFERRED EMBODIMENT

The present process can be practiced in the equipment usually found in industrial plants or on drilling rigs, especially the large variety used in offshore production of petroleum. The equipment needs only a facility to mix the alcohol and surface active chemical aid into the aqueous fluid. Then, a phase separation unit is required to remove the agglomerated insoluble solids and materials depending on their selective settling, floating, or suspended functions. For example, the agglomerated insoluble solids upon settling in a suitable container can be separated by decantation where the cleared aqueous fluid is removed or by an underflow withdrawal of the solids themselves. Where the agglomerated insoluble solids float upon the aqueous fluid, the solids can be removed by flotation over weirs, by air flotation procedures, or by moveable skimmers. If the agglomerated insoluble solids have a neutral buoyancy and remain suspended in the aqueous fluid, the solids can be removed by filtration such as by sand filters, electrostatic systems, filter presses, and like phase separation devices.

The term aqueous fluid as used herein, is intended to designate liquids which are water continuous and which liquids may contain fresh water, sea water or brine and varying in amounts of dissolved solutes such as salts, corrosion inhibitors and gases.

The term insoluble solids as used herein, is intended to designate insoluble materials such as rust, scale, sand, barite, metal carbonates and drilling mud. Also included in this term are insoluble materials such as oils, lubricants, corrosion inhibitors and additives and other substances that act like the insoluble solids or that are carried by them through surface phenomenon, etc.

For the present description, the well fluid is assumed to be loaded with about 1% by weight of insoluble solids and aqueous materials, which may be sand, formation particles and debris, oil, pipe dope, rust, insoluble carbonates, drilling mud and mud solids such as barite, emulsifier, thinners, cement and other solid materials in various combinations and amounts that are encountered in the cleaning of a well system.

As the first step of this process, a small effective amount of an alcohol and a surface active chemical aid are introduced into the aqueous fluid. However, the alcohol and surface active chemical aid can be added to the aqueous fluid jointly, separately and in any order. The amount of the alcohol is usually not required above 2% volume. Usually, good results are obtained using alcohol amounts above about 0.5% by volume. In most aqueous fluids, the alcohol can be used in the amount of 0.5% by volume and larger amounts, such as 1.0% by volume, do not seem to appreciably increase the desired solid removal results. Usually, the solids removal results decrease when the amount of the alcohol is decreased substantially below the 0.5% by volume level.

The amount of the chemical aid is usually not required above 2% by volume. Good results are obtained by using chemical aid in amounts above about 0.5% by volume. In most aqueous fluids, the chemical aid can be used in the amount of 0.5% by volume and larger amounts, such as 1.0% by volume, do not seem to appreciably increase the desired solid removal results. Usually, the solids removal results decrease when the amount of the chemical aid is decreased substantially below the 0.5% by volume level. Large amounts (e.g., above 3% by volume) of the chemical aid increases the amount of aqueous fluid trapped in the removed solids. The chemical aid, and particularly the surfactant in same, appears to change the surface tension of the boundary film surrounding the negatively charged solid particles, and especially the bentonite constituents from drilling muds. This effect provided by the chemical aid is primarily the function in agglomeration of the solids mass from the fluid It has been found that the minimum effective amounts of the alcohol and surface active chemical aid depend upon their activity nature and the particular solids in the well fluid. Thus, this minimum effective amount is emperical and there does not seem to be a determinable relationship in these amounts in a mixture between a particular alcohol and a certain surface active chemical aid from the groups hereinafter defined. This mixture does appear to immediately attack, coat, facilitate and agglomerate on contact the insoluble solids in the aqueous fluid.

After the alcohol and chemical aid are distributed within the fluid, it is allowed to rest in the quiescent state. The solids are removed from the liquid phase by agglomeration into a gel-like soft mass which then may float at the surface, settle to the container bottom or remain suspended in the fluid depending upon the composition and/or concentration of the alcohol and/or the surface active chemical aid. These solids remain stable in this agglomerated mass for substantial periods of time (e.g., a week) but can be redispersed if the aqueous fluid is subject to remixing operations. The mass of solids are removed from the liquid phase by flotation, decantation or filtration, respectively.

Generally, if the alcohol is added first to the aqueous fluid and then followed by the chemical aid, an immediate clearing of the liquid phase occurs upon termination of the mixing operations. Addition of the chemical aid before or with the alcohol, sometimes requires a long quiescent condition for clearing solids from the liquid phase. The solids clearing time is measured in minutes and usually is completed within less than one hour.

In either event, once the liquid phase has cleared, and the agglomerated mass of solids removed from it, the resultant well fluid is substantially solids-free especially of particle sizes greater than 5 microns in maximum dimension.

The alcohol can be an alcohol with between 5 and 14 carbon atoms.

Various alcohols within this range can be used but usually they will be in the range of between 6 and 12 carbon atoms. The lower alcohols (e.g., hexanol and 2-ethyl hexanol) usually give good results in producing floating agglomeration of solids whereas, the higher alcohols (e.g., trimethyl pentanol) produce an agglomeration of solids that settle from the liquid phase for a given chemical aid. These alcohols usually have a specific gravity of about 8.3 relative to water. The intermediate alcohols with between 9 and 11 carbon (e.g., n-nonyl and unidecyleric alcohols) atoms can produce an agglomeration of solids (at neutral buoyancy) that remains suspended in the liquid phase. Some experimentation is required with the alcohols between 11 and 14 carbon atoms because of their physical states can be waxy solids at the operating temperature of the liquid phase. For example, the alcohols, 1-dodecanol, 6-dodecanol and 1-tridecanol have melting points, respectively, of 24° C., 30° C. and 28° C. Alcohols with above 15 carbon atoms, such as 1-pentadecanol have elevated melting points (e.g., 43° C.) that they are solids in the liquid phase at operating temperatures and may fail to properly agglomerate the solids.

In the preferred embodiment, the alcohol is 2-ethylhexanol and the surface active chemical aid is bis hydroxy ethyl cetyl amine and each chemical is used in the amount of 0.5% volume of the aqueous fluid. Reference may be taken to our mentioned application for a more detailed description of these chemicals.

The alcohol, 2-ethyl hexanol, is also known as 2 ethyl hexyl alcohol and octyl alcohol. The chemical abstract service name is 1-hexanol, 2-ethyl. This alcohol can be obtained from sources of specialty solvents, and its slow evaporation rate and solvency make it useful in the present process. It has low water solubility and low surface tension properties which are an advantage in readily separating from the brine being cleaned of solids. A good source for this alcohol is the suppliers to the producers of plasticizers for vinyl resins. Obviously, the alcohol does not need to be of chemical purity but usually will be 99.0% by volume of pure alcohol with slight amounts of organic acids and aldehydes that do not interfere in this process. The 2-ethyl hexanol can be obtained commercially. Inc., and it has a relatively high COC flash point of 183° F., with a specific gravity of about 0.83 at 77° F.

The surface active chemical aid is a surfactant, and usually includes a carrier solvent such as a small amount of an aromatic hydrocarbon, corrosion and pitting inhibitor, and other additives desired to be added to the aqueous fluid. The surfactant should have a molecular weight in the range of about 150 to about 500 with predominant hydrophobic characteristics. The surfactant is selected from the group comprising amines, amides and amide oxides wherein the amine, amide and amide oxide have an alkyl group with between 8 and 18 carbon atoms. Good results can be obtained with surfactants that have a molecular weight of the surface active amine in the range of from about 150 to about 500, and with predominate hydrophobic characteristics.

Various amines can be used in this process. For example, the alkynol amines which are available under the Acquiness trademark can be used, such as Acquiness MA401A. It is understood that this amine is principally bis hydroxy ethyl cetyl amine.

Other examples of amines usable in this invention are cocoamine, octylamine, dioctylamine, decylamine and dodecylamine. Cocoamine may be generally represented by the formula $CH_3(CH_2)_{10}CH_2-NH_2$ and it is prepared from monoethenoid fatty acids derived from coconuts. The "coco" group $C_{12}H_{25}$ is not a group containing a specific number of carbon atoms, but is a number of individual groups containing different numbers of carbon atoms. However, the $C_{12}H_{25}$ group is in greater amount than any other group.

The cocoamine may be a condensation product, i.e. oxalkylated cocoamine such as ethoxylated cocoamine with between 2 and 15 mols of ethylene oxide. More particularly, the condensation product is formed by subjecting cocoamine to a condensation with a plurality of mols of ethylene oxide in a manner well known in the art. In general, the condensation product of a mol of cocoamine with between 2 and 15 mols of ethylene oxide may be employed with good results. Preferably, the condensation product is formed by condensing 10 mols of ethlene oxide per mol of cocoamine. Expressed on the basis of molecular weight, the ethoxylated cocoamine may have an average molecular weight between 285 and 860, but preferably, has an average molecular weight of about 645.

Preferably, the surfactant is the amide reaction product of a fatty monobasic acid and a secondary amine. More particularly, the fatty acid can be given the formula $C_nH_{2n+1}COOH$ wherein n is an integer between 12 and 18. The acid can be selected from the group of oleic and dimerized oleic, linoleic, palmit oleic, palmitic, myristic, myrestoleic and stearic acids. The oleic acid amide products give good results.

The secondary amines are selected from normal amines that react with the fatty monobasic acids to form fatty amides that are generally used as nonionic emulsifiers. Good results are obtained when the amine is diethanol amine.

One surfactant giving excellent results is a product of Witco Inc., and available under the tradename Witcamide 1017 (surfactant). It has a specific gravity of 1.0 (same as water) is amber with a PMCC flash point above 200° F., and it is a product not hazardous under current Department of Labor definitions.

The particular alcohol selected may be insoluble, or only slightly soluble in the aqueous fluid.

The surfactant, depending upon its high molecular weight, is practically insoluble in the water phase (e.g., about 25 p.p.m.). As a result, the specific gravity of the surfactant and alcohol mixture can be varied from light-to-heavy relative to the insoluble solid materials, to adjust the agglomerated solids so that they settle, float or become suspended (at neutral buoyance) in the aqueous fluid.

More particularly, selecting the concentration and/or carbon number in the alcohol and/or surfactant allows selection of how the agglomerated solids will be removed. For example, a surfactant with an alkyl group having at least and preferably between 10 and 12 carbon atoms (and a specific gravity of 1.0) will cause the agglomerated solids to settle in the aqueous fluid. Carbon atoms above 12 in the alkyl group usually produce solid phase surfactants that are more difficult to intermix into the aqueous phase.

If the surfactant has less than 10 carbon atoms in the alkyl group (and a specific gravity slightly less than 1.0) the agglomerated solids can be made to float or be suspended in the aqueous phase dependent upon the concentration or carbon atom number actually used. Where a solvent, such as diesel oil, is added in a small amount (e.g., 0.5% vol.) to the surfactant, the agglomerated solids will float in the aqueous fluid at the usual concentration of alcohol and surfactant.

For any given aqueous fluid and insoluble solids the concentration and/or composition of the alcohol and surfactant in the surface active chemical aid may be varied and require some experimentation to selectively have the agglomerated solids, settle, float or suspend in the aqueous fluid at its operating temperature. Then, these solids can be removed by decantation, flotation or filtration systems.

Naturally, the agglomerations of these insoluble solids selectively into one of the three systems depends upon the concentration and/or composition of the alcohol and surfactant and any solvent employed in the present process.

It is preferred that the alcohol be added first and thoroughly admixed into the aqueous well fluid before the addition of the surface active chemical aid. However, with certain alcohol and surface active chemical aid combinations, these materials can be added together and good solids removed can be produced in this process. At this time, there is no known guideline to aid in selecting these materials for use together in the aqueous fluid so as to produce the same level of good results as provided by the separate but successive addition of the alcohol and then the surface active chemical aid. Likewise, with certain ingredients, the surface active chemical aid can be admixed first with the well fluid, and then the alcohol is added with good solids removal by this process. At this time, there is no known guideline to aid in selecting which surface active chemical aid and alcohol will provide in this addition arrangement the desired good solids removal from well fluid. Unless the alcohol is first mixed into the well fluid and then followed by adding the surface active chemical aid, some experimentation will be required to determine which of these materials can be added together or in reverse order, and yet produce the desired good solids removal by the present process.

The operation theory of the alcohol and surface active chemical aid in the present process could not be determined within certainty from information presently available. It is believed that the alcohol serves to attack or destabilize the dispersed solids by disrupting their electrophoretic charges, and then the surfactant acts to coat, facilitate and then agglomerate or gather the solids, and assembled oily materials, into a solids system (settling, floating or in suspension) that can be removed by careful liquid/solids phase separation techniques which do not impose shear or mixing energy during solids removal.

The present process can be used to remove solids from aqueous fluid where the only physical separation system is a vessel. For this purpose, the alcohol and chemical aid are adjusted in composition and concentration so that the agglomerated solids either float on or settle from the quiescent liquid phase.

The alcohol and chemical aid, especially when using solvent free surfactants, and the heavier alcohols can produce the agglomeration of solids into a floating waxy-like deposit. For example, the alcohol as 6-dodecanol can agglomerate solids into a waxy floating body (using the specifically mentioned Witco surfactants). This waxy agglomerated solids can be removed from the liquid phase (below about 30° C.) using a hand skimmer or rake.

If desired, the creation of waxy-like agglomerated solids can be enhanced by the addition to the aqueous phase of a hardening material that transforms into the solid state while or after the agglomerated solids accumulate on the surface of the aqueous phase. For example, a hardening material can be floated upon the surface of the aqueous phase. The hardening material should be solids free and capable of reaching the solid state while embedding in it the agglomerated solids.

The hardening material can be a drying oil (including linoleic acid) such as the drying oils used in paints and varnishes. Also, the polyunsaturated oils, such as safflower, cottonseed and linseed oils that are easily oxidized and polymerized into hard films can be used. Alternatively, various polymers (e.g., acrylic film formers) can be used that can undergo reaction on the surface of the aqueous phase so as to embed the agglomerated solids into a waxy state for easy removal by rakes, skimmers or the like.

If a proper combination of alcohol and chemical aid is selected, the agglomerated solids will settle to the bottom of the containing vessel. The use of a high molecular weight alcohol (e.g, 14 carbon) and surfactant not only cause the agglomerated solids to settle to the bottom of the vessel but also to cause these solids to stick to the vessel. As a result, decantation of the solids-free aqueous fluid is readily accomplished.

In general, the present process can be used to remove solids from all types of aqueous fluids. Usually, the presence of corrosion inhibitors, antipitting compounds, etc. will not create any problems in solids removal. Some of the materials used in preparing drilling muds can interfere in the process, as by requiring increased amounts of alcohol, surface active chemical aid, or in extending the time required for separation of the solids from the liquid phase. These interfering materials can be removed before practicing the present process steps. For example, the aqueous fluid may have an appreciable amount of polyelectrolytes or polymers such as cellulose based organic fluid loss agents (e.g., HEC). In these cases, the polymer can be removed by early treatment of the aqueous fluid with a strong oxidant such as hydrogen peroxide before practicing the present process on the aqueous fluid.

From the foregoing, it will be apparent that there has been herein described a process for removing selectively insoluble solids from aqueous fluid which is especially effective. Various changes and alterations may be made in the practice of this process by those skilled in the art without departing from the spirit of the invention. It is intended that such changes be included within the scope of the appended claims. The present description is intended to be illustrative and not limitative of the present invention.

What is claimed is:

1. A process for removing insoluble solids consisting of rust, scale, sand, barite, formation particles and drilling mud solids from an aqueous fluid produced in well systems during cleaning operations, comprising:
   (a) introducing into the aqueous fluid in a small effective amount of an alcohol with between 5 and 14 carbon atoms and a water insoluble surface active chemical aid; the surface active chemical aid including essentially a surfactant having a molecular weight in the range of 150 to about 500 with predominant hydrophobic characteristics and the surfactant selected from the group consisting of amines, amides and amine oxides wherein the amine, amide and amine oxide have an alkyl group with beteen 8 and 18 carbon atoms;
   (b) adjusting the concentration of at least one of the alcohol and surface active chemical aid to control agglomeration of the insoluble solids and then to settle, float or suspend the same in the aqueous fluid; and
   (c) in a quiescent separation zone, removing the agglomerated insoluble solids by decantation, flotation or filtration, respectively.

2. The process of claim 1, wherein the surfactant has an alkyl group with at least 10 carbon atoms whereby the agglomerated solids settle from the aqueous fluid for subsequent removal by decantation in the separation zone.

3. The process of claim 2, wherein the alkyl group has between 10 and 12 carbon atoms.

4. The process of claim 1, wherein the surfactant has sufficiently less than 10 carbon atoms in the alkyl group so that the agglomerated solids remain suspended in the aqueous fluid for subsequent removal by filtration in the separation zone.

5. The process of claim 1, wherein the surfactant has less than 10 carbon atoms in the alkyl group and includes a distillate hydrocarbon solvent so that the agglomerated insoluble solids float upon the aqueous fluid for subsequent removal.

6. The process of claim 5, wherein the solvent is diesel oil.

7. The process of claim 1, wherein the surfactant has sufficient carbon atoms in the alkyl group to provide a specific gravity of about 1.0.

8. The process of claim 1, wherein the surfactant is the amide reaction product of oleic acid, and diethanol amine.

9. The process of claim 7, wherein the concentration of the surface active chemical aid is adjusted to control agglomeration of the insoluble solids and then to settle, float or suspend same in the aqueous fluid.

10. The process of claim 1, wherein the surfactant is the amide reaction product of diethanol amine with an organic fatty monobasic acid of the general formula $C_nH_{2n+1}COOH$ wherein n is an integer between 12 and 18.

11. The process of claim 1, wherein the alcohol and surface active chemical aid are used in a 50/50 mixture by volume.

12. The process of claim 1 wherein the alcohol has less than 12 carbon atoms whereby the agglomerated solids float upon the aqueous fluid.

13. The process of claim 1 wherein the alcohol has more than 11 carbon atoms and the agglomerated solids are embedded within a waxy mass.

14. The process of claim 1 wherein a liquid hardening material selected from the group consisting of acrylic film forming polymers and easily air oxidized or polymerized drying oils is added to the surface of the aqueous phase during agglomeration of the solids whereby they are embedded within a waxy mass removeable by hand tools such as rakes and skimmers.

15. The process of claim 14 wherein the hardening material is an air polymerizing liquid including linoleic acid.

16. The process of claim 14 wherein the hardening material is selected from the group consisting of safflower, cottonseed, soybean and linseed oils.

17. The process of claim 14 wherein the hardening material is an acrylic polymer.

* * * * *